(12) United States Patent
Testin et al.

(10) Patent No.: US 6,683,395 B2
(45) Date of Patent: Jan. 27, 2004

(54) POWER SUPPLY

(75) Inventors: William John Testin, Indianapolis, IN (US); James Wolter Ernst, Carmel, IN (US); John Ryan Schnellenberger, Westfield, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 328 days.

(21) Appl. No.: 09/896,256

(22) Filed: Jun. 29, 2001

(65) Prior Publication Data

US 2003/0001437 A1 Jan. 2, 2003

(51) Int. Cl.[7] .................................................. H02J 1/00
(52) U.S. Cl. ....................................................... 307/149
(58) Field of Search ............................. 307/44, 45, 149

(56) References Cited

U.S. PATENT DOCUMENTS

| 4,464,559 A | 8/1984 | Greene |
| 4,896,018 A | 1/1990 | Gilliland |
| 5,173,169 A | 12/1992 | Garrison et al. |
| 5,225,971 A | 7/1993 | Spreen |
| 5,805,436 A * | 9/1998 | Lin .............................. 363/60 |
| 5,811,757 A | 9/1998 | Higgins |
| 6,061,577 A * | 5/2000 | Andrieu et al. ............. 455/572 |
| 6,198,245 B1 | 3/2001 | Du et al. |

OTHER PUBLICATIONS

Search Report for EPO Appln. No. 02291461.8–2207 dated Sep. 30, 2002.

* cited by examiner

*Primary Examiner*—Gregory J. Toatley, Jr.
(74) *Attorney, Agent, or Firm*—Joseph S. Tripoli; Joseph J. Laks; Daniel E. Sragow

(57) ABSTRACT

A connector with a limited ampacity supplies a load which draws more current than the ampacity of the connector. A buck converter changes the power passing through the connector to a higher current at a lower voltage to energize the load.

Alternatively, if the load is intermittent, the current passing through the connector may charge a large capacitor which is able to supply a larger current to the intermittent load. The capacitor may also be used to power a continuous load, such as a memory, during failure of a power supply feeding the connector.

1 Claim, 1 Drawing Sheet

POWER SUPPLY

FIELD OF THE INVENTION

This invention relates to power supplies for auxiliary devices located outside of a main device. More particularly, the invention relates to TV receivers which supply power to an external module.

BACKGROUND OF THE INVENTION

In the past, the amount of current that a television receiver was able to provide to an external module was limited to about one ampere, because a connector which has an ampacity of more than one ampere tends to be bulky and expensive. As a result, external modules for use with television receivers have been limited to those drawing one ampere or less.

Ampacity is defined by the USA National Electrical Code as the current carrying capacity of electric conductors, expressed in amperes.

SUMMARY OF THE INVENTION

The instant invention allows a conventional connector to power a module requiring higher current than the ampacity of the connector.

In a first embodiment of the invention, a power supply arrangement, for passing power through a connector having a limited ampacity, comprises a load having a predetermined voltage and amperage requirement. A power source having a voltage higher than the load requirement produces a current lower than the load requirement. A converter means converts the source of high voltage at low current to a lower voltage at a higher current. The output of the source is coupled through the connector to the input of the converter means. The output of the converter means is coupled to the load.

In another embodiment of the invention, a power supply arrangement for passing power through a connector having a limited ampacity comprises an intermittent load having a predetermined voltage and amperage requirement. A power source has a voltage approximately equal to the predetermined voltage requirement and produces a current less than the amperage requirement. The power source is coupled through the connector to a capacitance. The intermittent load is coupled to the capacitance.

DETAILED DESCRIPTION

Figure 1:
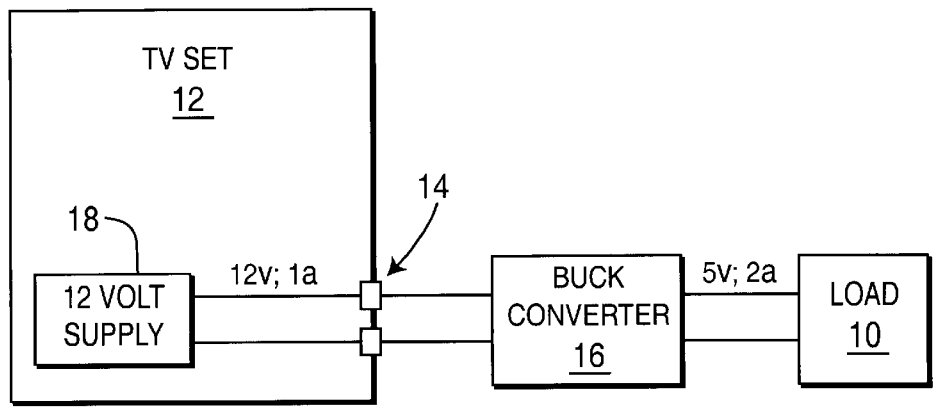
FIG. 1 shows a first embodiment of the invention using a converter which increases current and decreases voltage.

FIG. 1 shows an arrangement for energizing a load 10 which is external to a television set 12. The load 10 requires a high current, such as two amperes, which is beyond the capability of connector 14, which has an ampacity rating of one ampere. The invention therefore provides a twelve volt supply 18, which provides twelve volts at one ampere. This is within the ampacity rating of connector 14. A converter means, such as buck converter 16, converts the twelve volts at one ampere to five volts at two amperes, in order to energize load 10. In this way, connector 14, which has an ampacity rating of one ampere, is able to supply load 10, which draws two amperes.

Figure 2:
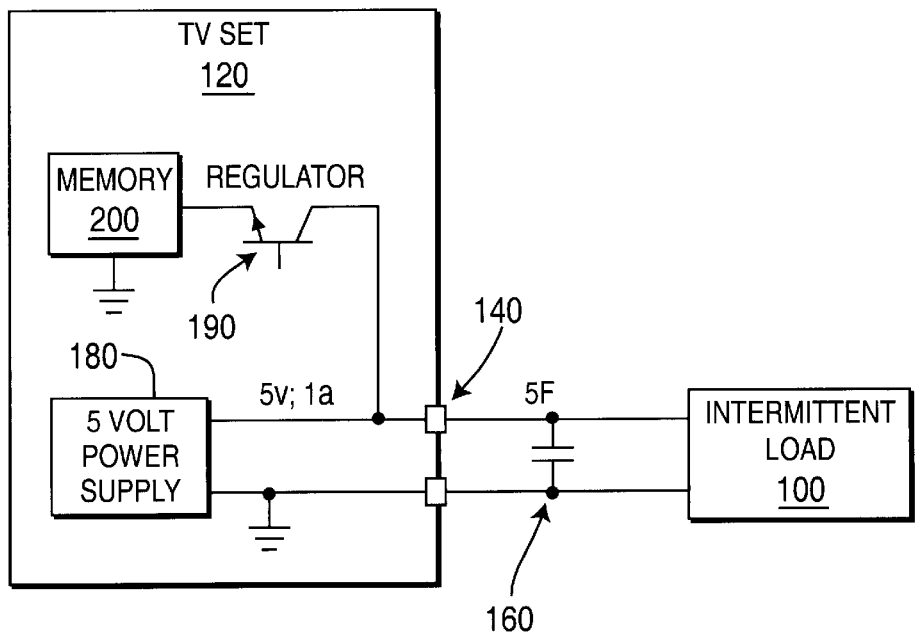
FIG. 2 shows a second embodiment of the invention using a capacitance to power an intermittent load.

FIG. 2 shows another embodiment of the invention. In FIG. 2, TV set 120 contains a five volt power supply 180 which produces one ampere. However, intermittent load 100, which is external of the TV set, draws more than one ampere, such as in the range of two amperes. The invention provides a high value capacitance 160, such as a five farad Supercap, coupled across the supply for intermittent load 100. Capacitance 160 may be charged by the current from power supply 160, which produces one ampere. However, since load 100 is intermittent, it may draw a higher value of current from capacitance 160.

The embodiment of the invention shown in FIG. 2 may be used to supply current to a continuous load, such as memory 200, through regulator 190, in the event that there is a failure of power supply 180.

What is claimed is:

1. A power supply arrangement for passing power to a load through a connector having a limited ampacity, said load having a predetermined voltage and amperage requirement, said amperage requirement exceeding the ampacity of said connector; comprising:

a power source having a voltage higher than said load requirement and producing a current within the ampacity of said connector;

a converter means for converting said source of high voltage at low current to a lower voltage at higher current;

the output of said power source being coupled through said connector to the input of said converter means; and the output of said converter means being coupled to said load.

* * * * *